(12) United States Patent
Moser

(10) Patent No.: US 9,764,431 B2
(45) Date of Patent: Sep. 19, 2017

(54) TEMPORARY ELECTRICAL GROUNDING SYSTEM HAVING A MAGNETIC ASSEMBLY

(71) Applicant: MAG-GROUND, INC., Wyomissing, PA (US)

(72) Inventor: Kandis L. Moser, Sinking Springs, PA (US)

(73) Assignee: Mag-Ground, Inc., Wyomissing, PA (US)

( * ) Notice: Subject to any disclaimer, the term of this patent is extended or adjusted under 35 U.S.C. 154(b) by 0 days.

(21) Appl. No.: 15/189,465

(22) Filed: Jun. 22, 2016

(65) Prior Publication Data

US 2016/0301147 A1    Oct. 13, 2016

Related U.S. Application Data

(63) Continuation-in-part of application No. 14/990,381, filed on Jan. 7, 2016, now Pat. No. 9,601,846.

(Continued)

(51) Int. Cl.
| | |
|---|---|
| H01R 11/30 | (2006.01) |
| H01R 13/60 | (2006.01) |
| B23K 37/00 | (2006.01) |
| H01R 4/56 | (2006.01) |
| B23K 9/32 | (2006.01) |
| H01R 13/62 | (2006.01) |
| H01R 4/64 | (2006.01) |
| H01R 11/22 | (2006.01) |

(52) U.S. Cl.
CPC ............ *B23K 37/006* (2013.01); *B23K 9/321* (2013.01); *H01R 4/56* (2013.01); *H01R 4/64* (2013.01); *H01R 11/22* (2013.01); *H01R 11/30* (2013.01); *H01R 13/6205* (2013.01)

(58) Field of Classification Search
CPC ................ H01R 13/648; H01R 13/652; H01R 13/65802; H01R 13/6205; H01R 11/30; H01R 13/60; H01R 4/38; H01R 4/64; H01R 4/56; H01R 4/66; H01R 11/22
USPC .............................. 439/38–40, 100, 104, 108
See application file for complete search history.

(56) References Cited

U.S. PATENT DOCUMENTS

| | | | | |
|---|---|---|---|---|
| 3,594,681 A | * | 7/1971 | Weiss ........................ | F21S 4/10 362/378 |
| 3,967,872 A | * | 7/1976 | Mooney ................... | H01R 4/64 174/78 |

(Continued)

*Primary Examiner* — Chandrika Prasad
(74) *Attorney, Agent, or Firm* — McNees Wallace & Nurick LLC

(57) ABSTRACT

A system and apparatus for providing a temporary electrical bonding/grounding connection between a first conductive member and a second conductive member. The apparatus includes an electrically conductive cable having first and second ends. At least one magnet assembly is provided for mounting to the first conductive member. The at least one magnet assembly has multiple arcuate surfaces of different radiuses of curvature, with respective surfaces of the multiple arcuate surfaces being configured to properly mount to a respective arcuate surface of the first conductive member. A conductive coupling is provided on the at least one magnet assembly. The conductive coupling is configured to be electrically coupled to the first end of the cable. The second end of the cable is configured to be detachably and electrically coupled to the second conductive member.

20 Claims, 10 Drawing Sheets

Related U.S. Application Data

(60) Provisional application No. 62/101,175, filed on Jan. 8, 2015, provisional application No. 62/182,726, filed on Jun. 22, 2015.

(56) References Cited

U.S. PATENT DOCUMENTS

| | | | | |
|---|---|---|---|---|
| 4,623,204 | A * | 11/1986 | Auclair | H01R 4/40 24/279 |
| 5,364,281 | A * | 11/1994 | Leto | H01R 4/643 403/378 |
| 6,659,800 | B1 * | 12/2003 | Wu | H01R 13/6599 439/607.11 |
| 6,910,899 | B1 * | 6/2005 | Daume | F16L 11/127 439/100 |
| 7,967,615 | B2 * | 6/2011 | Zacharevitz | H01R 13/648 439/100 |
| 2003/0094297 | A1 * | 5/2003 | Morrow | B29C 47/0023 174/505 |
| 2005/0128757 | A1 * | 6/2005 | Schneider | B60Q 1/2615 362/398 |
| 2009/0176383 | A1 * | 7/2009 | Amotz | H01R 9/28 439/39 |
| 2010/0285674 | A1 * | 11/2010 | David | H01R 13/6205 439/39 |
| 2016/0190743 | A1 * | 6/2016 | Shelton | H01R 4/64 439/38 |
| 2016/0204528 | A1 * | 7/2016 | Moser | H01R 4/64 439/40 |

\* cited by examiner

TEMPORARY ELECTRICAL GROUNDING SYSTEM HAVING A MAGNETIC ASSEMBLY

FIELD OF THE INVENTION

The present invention is directed to a temporary electrical bonding or grounding system to protect utility workers and the like from stray electrical current. In particular, the invention is directed to temporary electrical bonding or grounding system which has at least one magnet which attaches to a pipe to provide electrical grounding to the area of a pipe on which work is being performed.

BACKGROUND OF THE INVENTION

People working on metallic or conductive pipes, such as, for example, but not limited to, pipes used in the oil and gas industry, are exposed to electrical current as part of their daily jobs. One of the culprits relates to the Electrical Code (NEC) allowing grounding of electrical systems to pipes in building. Stray electrical current is passed through the metallic pipes inside the buildings through to the pipes outside. Another culprit relates to the repair and maintenance of the pipes. When welding is required, electrical current must be generated to perform the welding operation.

Service crews repairing, replacing or updating the pipes must handle the exposed metal pipes and can be electrically shocked by the undesired or stray current traveling through the pipes.

In addition, when welding, grounding of electrical circuits is a safety practice that is documented in various codes and standards. A typical arc welding setup may consist of several electrical circuits. Applying and maintaining proper grounding methods within the welding area is important to promote electrical safety in the workplace. Associated processes such as plasma cutting will also benefit from proper grounding.

Welding machines that utilize a flexible cord and plug arrangement or those that are permanently wired into an electrical supply system contain a grounding conductor. The grounding conductor connects the metal enclosure of the welding machine to ground.

The purpose of connecting the equipment enclosure to ground is to ensure that the metal enclosure of the welding machine and ground is at the same potential. When they are at the same potential, a person will not experience an electrical shock when touching the two points. Grounding the enclosure also limits the voltage on the enclosure in the event that insulation should fail within the equipment.

The current carrying capability of the grounding conductor is coordinated with the overcurrent device of the electrical supply system. The coordination of ampacity allows the grounding conductor to remain intact even if there is an electrical fault within the welding machine.

The welding circuit consists of all conductive material through which the welding current is intended to flow. Welding current flows through the welding machine terminals, welding cables, workpiece connection, gun, torch, electrode holder and workpiece. The welding circuit is not connected to ground within the welding machine, but is isolated from ground.

According to ANSI Z49.1, "Safety in Welding, Cutting and Allied Processes," the workpiece must be grounded. The workpiece must be connected to a suitable ground. The ground connection should be independent or separate from the welding circuit connection.

While there are currently arcane grounding systems and procedures in place, the systems and procedures are difficult to implement and are not routinely followed. It would, therefore, be beneficial to provide a grounding system and components which are easy and effective to use. It would also be beneficial to provide a grounding system and components which can be easily transported and minimizes the time and effort to set up and take down the system. It would also be beneficial to provide sufficient grounding when field welding is done to allow the welding apparatus to properly perform and to protect the operator of the welding machine from exposure to the harmful electrical current.

SUMMARY OF THE INVENTION

An object of the bonding/grounding system of the present invention is to prevent any utility worker from getting shocked by stray electrical current, whether the stray electrical current is a result of grounding the electrical system to water pipes in a home, insufficient grounding of the home when constructed or the aging of our current infrastructure.

An object of the bonding/grounding system of the present invention is to prevent workers from being exposed to stray electrical current in metallic piping, the system comprising a temporary electrical bonding/grounding system which allows the stray electrical current to continue to pass through the temporary ground and bypass the area to be worked on.

An object of the present invention is to provide a magnet assembly for use with a temporary electrical bonding/grounding system, the magnet assembly comprising multiple surfaces which cooperate with an arcuate surface of a conductive member, with respective surfaces being used properly mount to arcuate surfaces of different radiuses of curvature.

An object of the present invention is to provide a magnet assembly for use with a welding apparatus, the magnet assembly comprising multiple surfaces which cooperate with an arcuate surface of a work piece, with respective surfaces being used properly mount to arcuate surfaces of different radiuses of curvature. The temporary electrical bonding/grounding system allows the circuit needed for welding to be completed while grounding the work piece.

An embodiment is directed to an apparatus for providing a temporary electrical bonding/grounding connection between a first conductive member and a second conductive member. The apparatus includes an electrically conductive cable having first and second ends. At least one magnet assembly is provided for mounting to the first conductive member. The at least one magnet assembly has multiple arcuate surfaces of different radiuses of curvature, with respective surfaces of the multiple arcuate surfaces being configured to properly mount to a respective arcuate surface of the first conductive member. A conductive coupling is provided on the at least one magnet assembly. The conductive coupling is configured to be electrically coupled to the first end of the cable. The second end of the cable is configured to be detachably and electrically coupled to the second conductive member.

An embodiment is directed to a bonding/grounding system to prevent workers from being exposed to stray electrical current in piping which conducts stray electrical current. The system includes an electrically conductive cable having first and second ends. A first magnetic assembly is provided and includes a first removable conductive post which is dimensioned to receive the first end of the electrically conductive cable. The first magnetic assembly is configured to be electrically and magnetically coupled to the first end of the electrically conductive cable. A second magnetic assembly is provided and includes a second removable conductive post which is dimensioned to receive the second end of the electrically conductive cable. The second magnetic assembly is configured to be electrically and magnetically coupled to the second end of the electrically conductive cable. The temporary electrical bonding/grounding system allows stray electrical current in the piping to pass through the first magnetic assembly, the conductive cable and the second magnetic assembly to allow the stray electrical current to bypass an area of the piping to be worked on.

An embodiment is directed to a bonding/grounding system to prevent workers from being exposed to stray electrical current when welding. The system includes an electrically conductive cable having first and second ends. A magnet assembly is provided for mounting to a first conductive member. The magnet assembly has multiple arcuate surfaces of different radiuses of curvature, with respective surfaces of the multiple arcuate surfaces being configured to properly mount to a respective arcuate surface of a work piece. A conductive coupling is provided on the magnet assembly. The conductive coupling is configured to be electrically coupled to the first end of the cable. The second end of the cable is configured to be detachably and electrically coupled to a welding apparatus. The temporary electrical bonding/grounding system allows the circuit needed for welding to be completed while grounding the work piece.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 10 illustrates a perspective view of the temporary electrical bonding/grounding system of FIG. 9 with a cable attached there between.

DETAILED DESCRIPTION OF THE INVENTION

Figure 1:
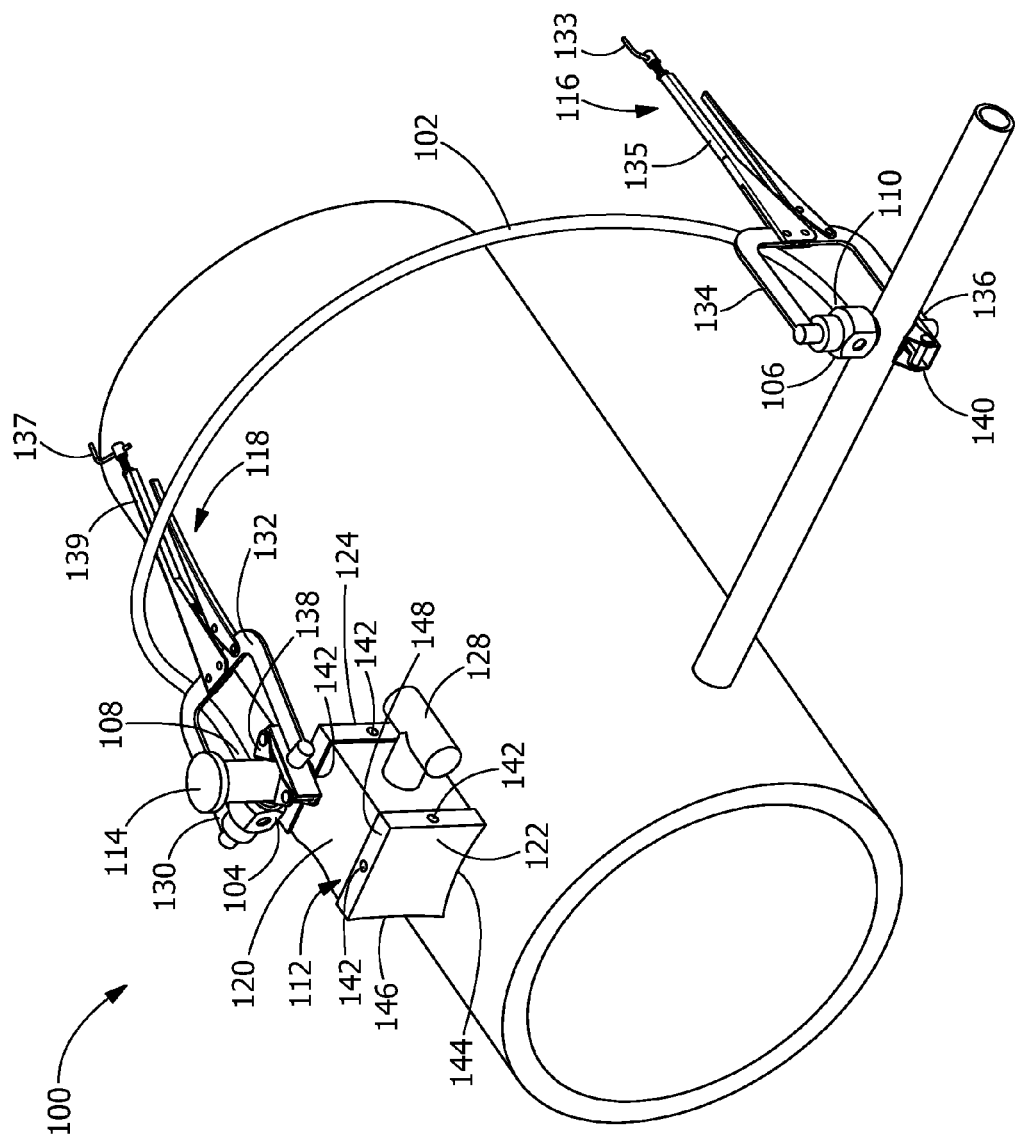
FIG. 1 illustrates a perspective view of an illustrative first embodiment of a temporary electrical bonding/grounding system of the present invention, the system which includes a magnetic component.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Referring to FIG. 1, a first illustrative embodiment 100 of a temporary electrical bonding/grounding system is shown. The system allows stray electrical current to be circumvented or detoured around an area of a pipe to be repaired, thereby preventing electrical shock to the personnel repairing the pipe.

A first electrically conductive cable 102, having a first end 108 and a second end 110, is electrically coupled to a first conductive coupling 104 at the first end 108 and a second conductive coupling 106 at the second end 110. The first conductive coupling 104 is electrically coupled to a first magnetic assembly or component 112 using a first conductive member or magnet clamp 118 secured to a conductive mount or post 114. The post 114 is positioned on the first magnetic component 112 at one of a plurality of locations 142. The magnet clamp 118 includes a first half 130 and a second half 132 which are brought together when the magnet clamp 118 is closed, thereby electrically coupling and securing the magnet clamp 118 to the post 114. The first half 130 of the magnet clamp 118 retains the first conductive coupling 104, and the second half 132 of the magnetic clamp 118 retains a saddle 138, which work together to engage and retain the post 114 when the magnet clamp 118 is closed. The first magnetic component 112 includes a curved contour 144 that matches the curved contour of the pipe. The second conductive coupling 106 comprises a second conductive member or pipe clamp 116. The pipe clamp 116 includes a first half 134 and a second half 136. The first half 134 of the pipe clamp 116 retains the second conductive coupling 106 and the second half 136 of the pipe clamp 116 retains a pipe saddle 140. When the pipe clamp 116 is closed the first and second halves 134 and 136 are brought together to engage and secure a pipe.

Figure 2:
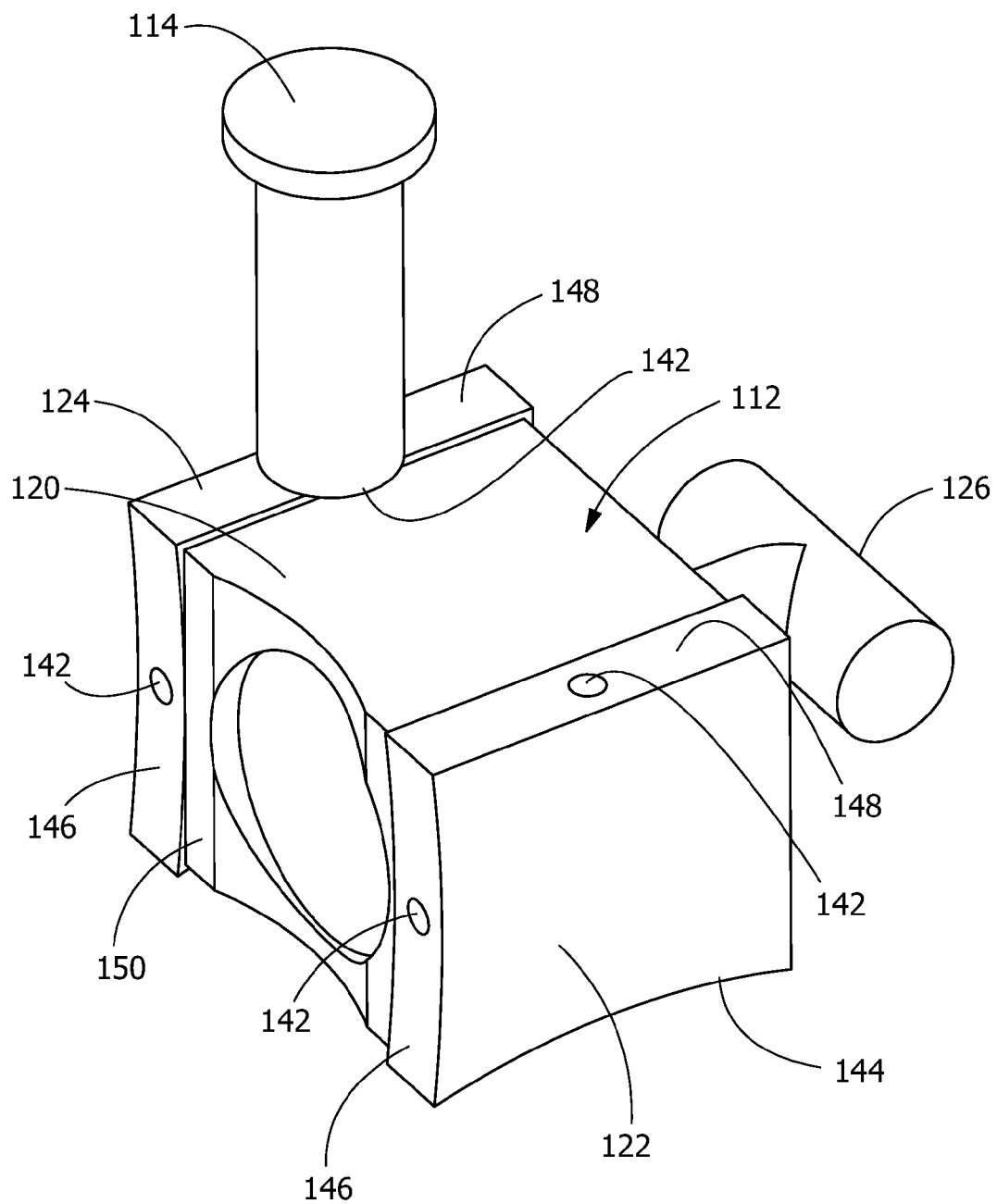
FIG. 2 illustrates a perspective view of an illustrative magnetic component used in the temporary electrical bonding/grounding system.

Referring to FIG. 2, the magnetic component 112 is shown. The magnetic component 112 includes a magnet 120, shoes 122, 124, a positioning handle 126 and the post 114 positioned at one of a plurality of locations 142 on the shoes 122, 124. Each of the shoes 122, 124 has a first curved surface 144, a second curved surface 146 and third curved surface 148. The first curved surfaces 144 of each of the shoes 122, 124 of the magnetic component 112 are positioned to extend in the same direction. The second curved surfaces 146 of each of the shoes 122, 124 of the magnetic component 112 are positioned to extend in the same direction, which is in a different direction than the first curved surfaces 144. The third curved surfaces 148 of each of the shoes 122, 124 of the magnetic component 112 are positioned to extend in the same direction, which is in a different direction than the first curved surfaces 144 and the second curved surface 146. The first, second and third curved surfaces 144, 146, 148 have different contours or radius of curvature, thereby allowing the first, second and third curved surfaces 144, 146, and 148 to engage and make electrical connection with different sized pipes or different pipe diameter ranges (such as, but not limited to, pipes greater than 2 inches, 4-8 inches, 10-12 inches, 16+ inches). For example, the third curved surface may be minimally curved or substantially flat to engage the side of a large diameter pipe. Any number or size of curved surfaces may be selected for the shoes 122, 124, based on the design needs. In the embodiment shown, the magnet 120 has generally planar sides, as the shoes 122, 124 are configured to accommodate the different diameters or sizes of the pipe. The shoes 122, 124 are made from material which is attracted to the magnet 120, thereby facilitating the physical and electrical connection between the shoes 122, 124 and the magnet 120. Alternatively, or in addition, the shoes 122, 124 may be fixed to the magnets 120 using known fastening means, such as, but not limited to, bolts.

In the illustrative embodiment shown, the locations 142 are openings provided on the shoes 122, 124. The positioning of the openings 142 may vary depending upon the configuration of the shoes 122, 124. In order to facilitate ease of operation, openings 142 are positioned to multiple side surfaces of the shoe 122, 124. This allows for the proper insertion of the post 114 into a respective opening 142, regardless of which of the curved surface 144, 146, 148 is placed in engagement with the pipe. While threaded openings 142 are shown, the locations may be other types of openings or surface which can maintain the post 114 in position and provide the required electrical connection between the post 114 and the shoes 122, 124.

Figure 3:
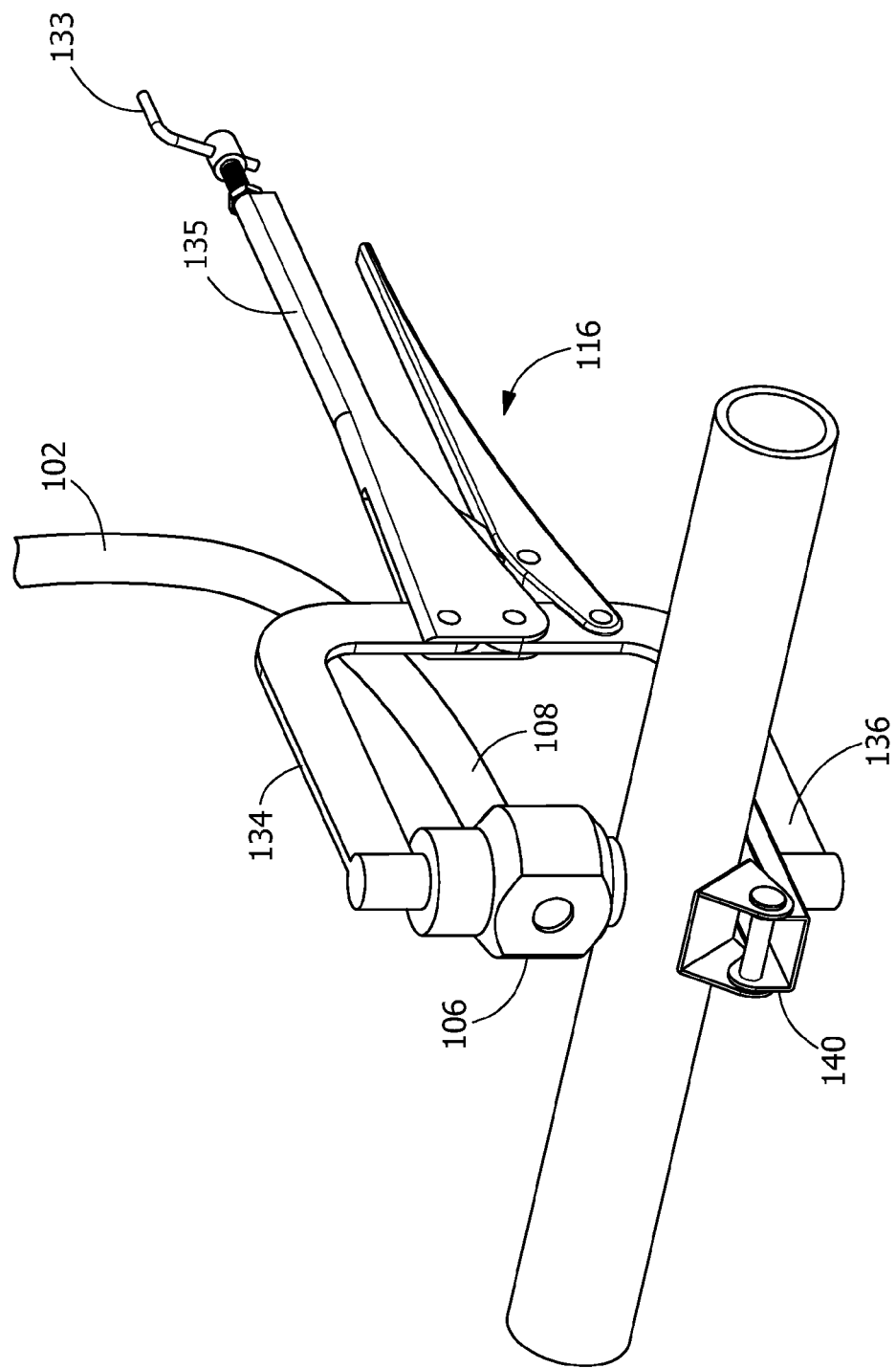
FIG. 3 illustrates a perspective view of an illustrative clamp used to connect to a pipe in the temporary electrical bonding/grounding system.

Referring to FIG. 3, the pipe clamp 116 configured to connect a conductive coupling to a pipe is shown. The pipe clamp 116 and the magnet clamp 118 may be similar, and may in fact be the same clamp, with the post 114 similar in size and shape to a small copper pipe to which clamp 116 would attach. In this regard, the clamps 116, 118 may be selected and designed to be interchangeable. FIG. 3 shows a pipe clamp 116 with the first half 134 and the second half 136 configured to engage and secure a small pipe. The first half 134 includes the first conductive coupling 106 and the second half 136 includes the post saddle 140 for grasping the pipe. The first end 108 of the electrically conductive cable 102 is shown electrically coupled to the first conductive coupling 106 which is affixed to the first half 134 of the pipe clamp 116. A crank or tightening member 133 may be provided on the handle 135 to facilitate the attachment and adjustment of the pipe clamp 116 to pipes of various diameters or sizes.

Figure 4:
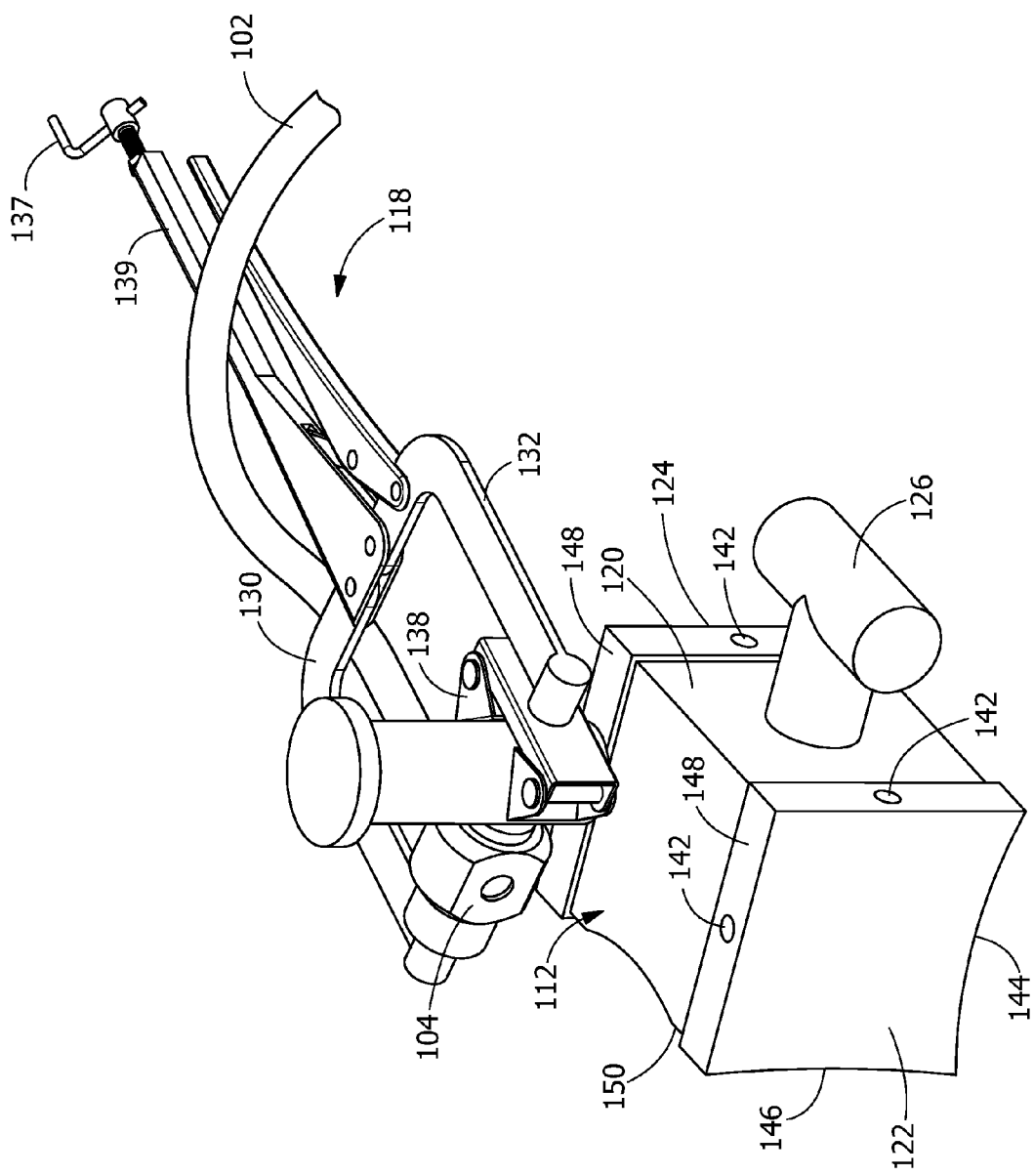
FIG. 4 illustrates a perspective view of an illustrative clamp used to connect to the magnet component in the temporary electrical bonding/grounding system.

Referring to FIG. 4, the magnetic clamp 118 is configured to connect a first conductive coupling 104 to the magnetic component 112 as shown. The magnet clamp 118 includes a first half 130 and a second half 132. The first half 130 secures and retains the first conductive coupling 104 and the second half 132 secures and retains the post saddle 138. The post saddle 138 is configured to grasp the post 114 and hold it against the first conductive coupling 104 when the magnet clamp 118 is closed around the post 114, providing a secure and stable electrical connection between the first conductive coupling 104 and the post 114. The first conductive coupling 104 further includes a connection point 151 for an additional cable connection. A crank or tightening member 137 may be provided on the handle 139 to facilitate the attachment and adjustment of the magnetic clamp 118 to posts 114 of various diameters or sizes.

Figure 5:
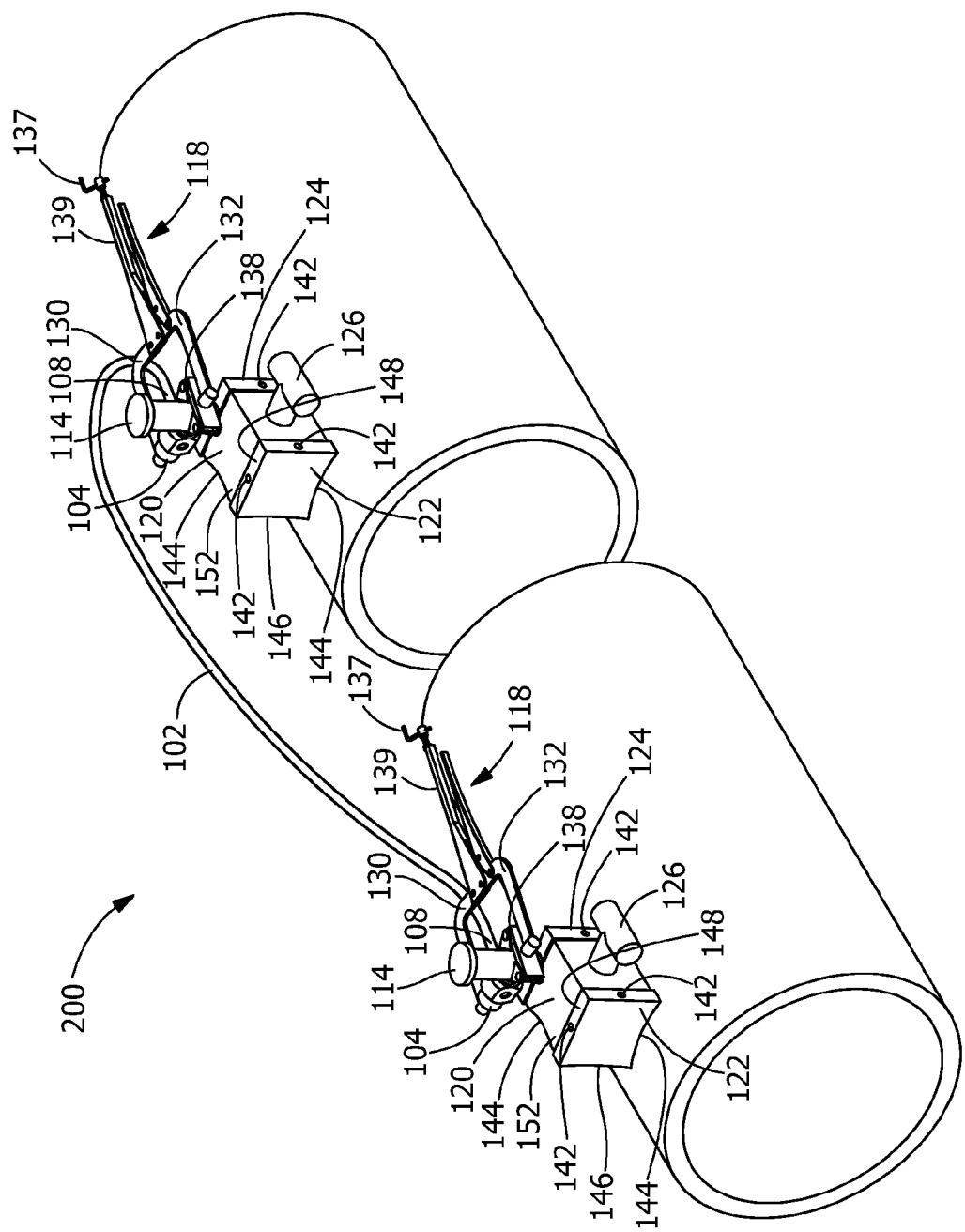
FIG. 5 illustrates a perspective view of the temporary electrical bonding/grounding system comprising having two magnetic components.

Referring to FIG. 5, a second embodiment 200 of the temporary electrical bonding/grounding system is shown. The system includes a first magnetic component 112A and a second magnetic component 112B which are shown electrically coupled to provide an electrical bypass between conductive surfaces of the pipe. The magnetic components 112A, 112B are similar to the magnetic component 112 described above and are coupled together using the first electrically conductive cable 102. As the operation of the magnetic components 112A, 112B are as described above.

Figure 6:
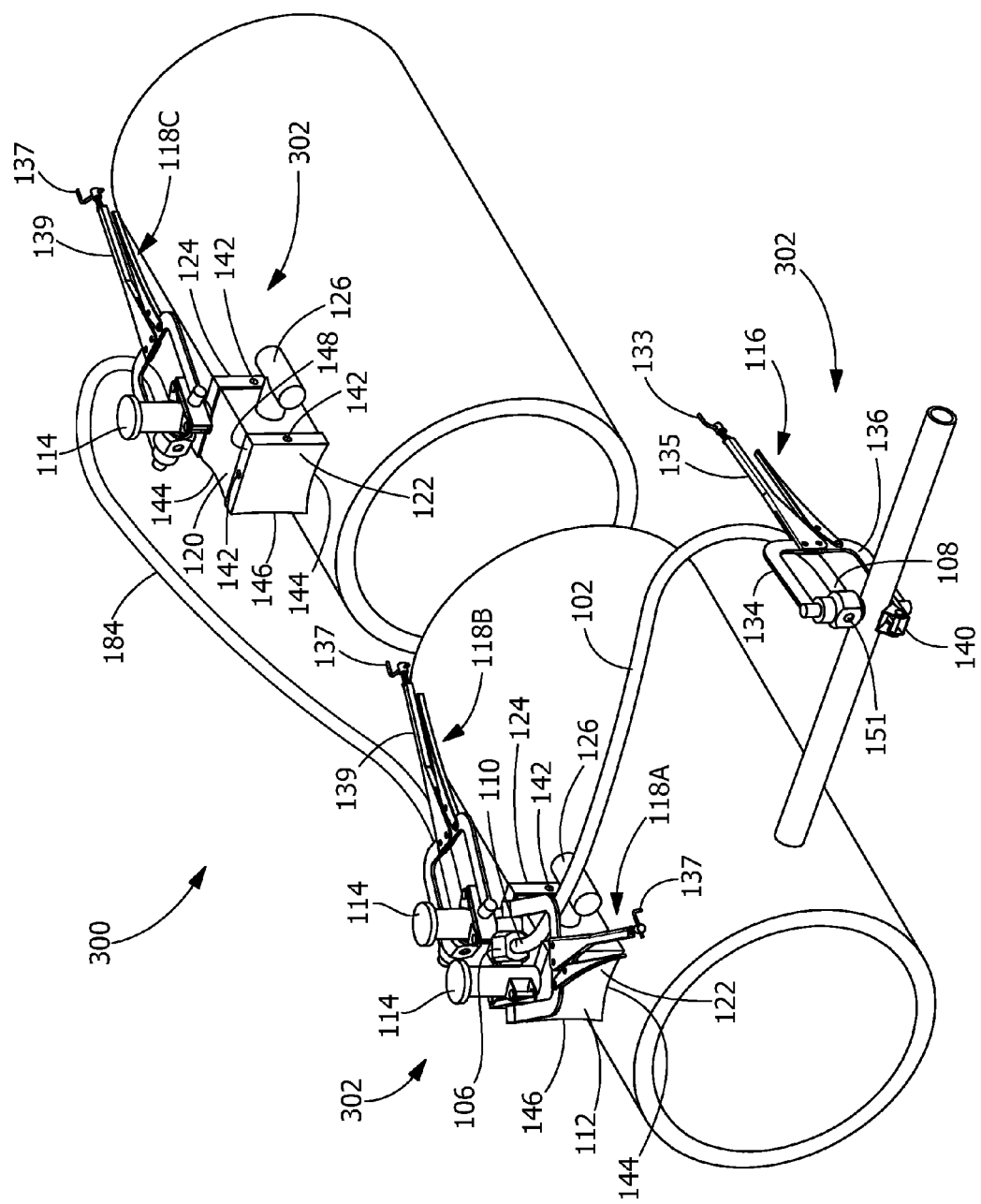
FIG. 6 illustrates a perspective view of the temporary electrical bonding/grounding system having multiple magnetic component and multiple cables.

Referring to FIG. 6, a third embodiment 300 of the temporary electrical bonding/grounding system is shown. In FIG. 6, multiple conductive elements 302 are joined to provide an electrical bypass. Any combination of clamps and magnetic components described herein can be used, and the arrangement shown in FIG. 6 is not limited to the elements shown or only three elements. FIG. 6 depicts one configuration in which a pipe clamp 116 is electrically coupled to a first magnetic clamp 118A through a first electrically conductive cable 102, and a second magnetic clamp 118B is electrically coupled to a third magnetic clamp 118C through a second electrically conductive cable 184.

In use, when attaching to a service line pipe, the following illustrative procedure can be used: i) excavate and expose service line on the house side of a curb stop; ii) clean off service line pipe to bare metal to allow pipe clamp 116 to make metal to metal contact; iii) excavate and expose portion of water main; iv) clean off water main pipe to bare metal to allow magnetic component 112 to be physically and electrically attached to the water main pipe; v) attach pipe clamp 116 to service line pipe and tighten; vi) attach magnetic component 118 to water main pipe; and vii) attach magnetic clamp 118 to post 114 of magnetic component 112 and tighten. Other illustrative procedures, which include additional steps or which install the components in a different order may be used.

In use, when attaching to a water main pipe, the following illustrative procedure can be used: i) excavate and expose water main on both sides of the area to be worked on; ii) clean off water main pipe to bare metal on either side to allow magnetic components 112 to be physically and electrically attached to the water main pipe; iii) attach magnetic components 118 to water main pipe on both sides of the area to be worked on; and iv) attach magnetic clamps 118 to posts 114 of each magnetic component 112 and tighten. Other illustrative procedures, which include additional steps or which install the components in a different order may be used.

In use, when attaching to a service line pipe and a water main pipe, the following illustrative procedure can be used: i) excavate and expose water main on both sides of the area to be worked on; ii) clean off water main pipe to bare metal on either side to allow magnetic components 112 to be physically and electrically attached to the water main pipe; iii) excavate and expose service line on the house side of a curb stop; iv) clean off service line pipe to bare metal to allow pipe clamp 116 to make metal to metal contact; v) attach magnetic components 118 to water main pipe on both sides of the area to be worked on; vi) attach magnetic clamps 118 to posts 114 of each magnetic component 112 and tighten; and vii) attach pipe clamp 116 to service line pipe and tighten. Other illustrative procedures, which include additional steps or which install the components in a different order may be used.

Referring to FIGS. 7 through 11, a fourth embodiment is shown in which the posts are replaced with by a female quick connect electrical grounding post 414 or a male quick connect electrical grounding post 415 which are made of conductive material, such as, but not limited to, brass or other types of metal or metal alloys. The grounding posts 414, 415 may be positioned on a magnetic component 112 at one of a plurality of locations 142, similar to the positioning of posts 114. The magnetic components shown in FIGS. 7-11 are essentially identical to the magnetic components described with respect to FIGS. 1-6.

Figure 7:
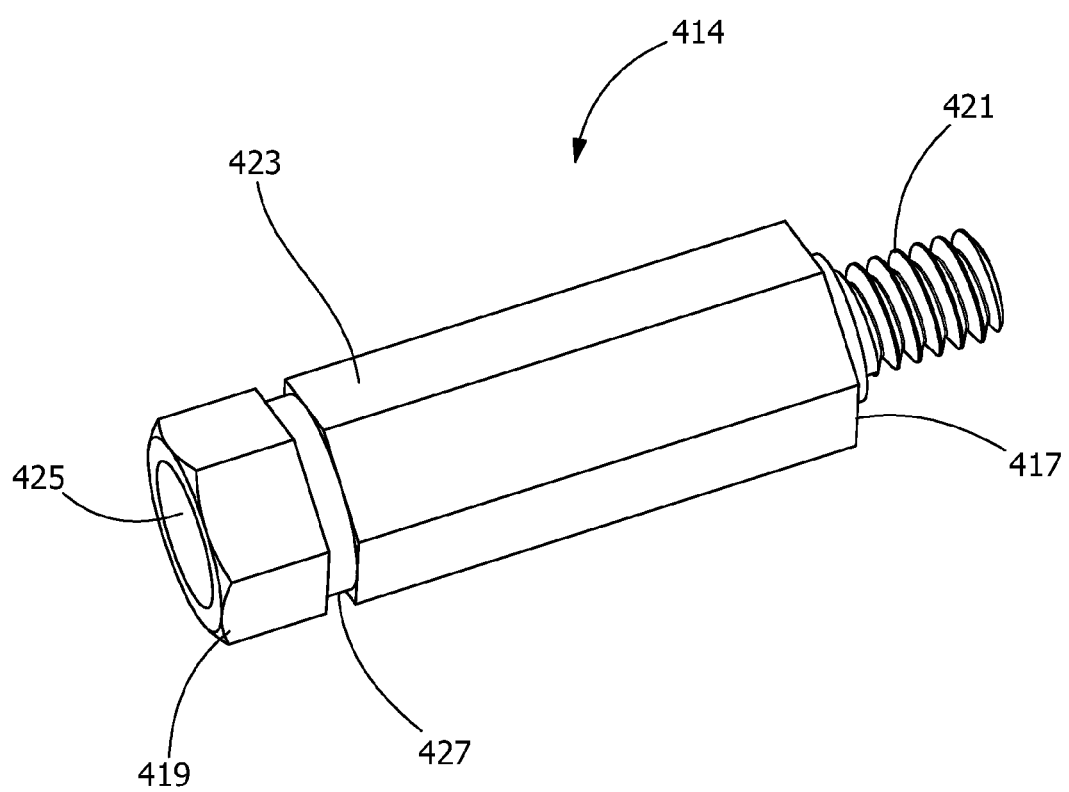
FIG. 7 illustrates a perspective view of an illustrative embodiment of a first alternate conductive mount or post which can be used with the magnet component, the conductive mount or post is a quick connect male connector.
Figure 9:
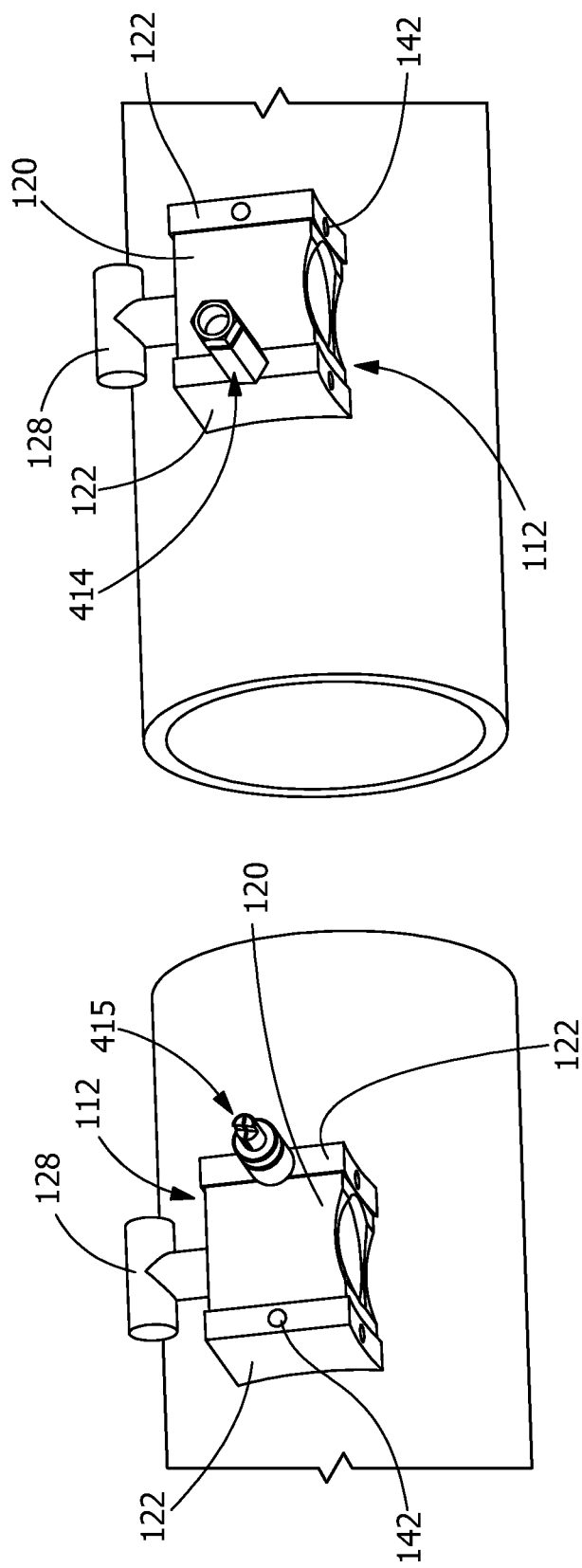
FIG. 9 illustrates a perspective view of two magnetic components attached to two respective pipe segment, a first magnetic component having a quick connect male connector and a second magnet component having a quick connect female connector.

As best shown in FIG. 7, the female grounding post 414 has a substantially cylindrical configuration which a magnet engaging end 417 and a cable engaging end 419. The magnet engaging end 417 has a treaded projection 421 which is dimensioned to be received and maintained in a respective threaded opening 142 of the magnet assembly 112.

The grounding post 414 includes a hollow portion 423 which extends from the cable engaging end 419 toward the magnet engaging end 417. The hollow portion defines a bore 425 for accepting a mating male quick connect cable connector 429 connected to and end of a cable 402 therein. In order to secure the male cable connector 429 (FIG. 10) within the bore 425, a shoulder or projection 427 extends into the bore 425. The projection 427 may be, but not limited to, a dimple, pin, wire or screw. The shoulder or projection 427 extends substantially radially into the bore 425 of the grounding post 414. The projection 427 may have a cam surface which can ride along a locking groove on the cable connector 429 in responsive to the rotation of the male cable connector 429 with respect to the female grounding post 414.

In use, the male cable connector 429 is inserted into the bore 425 of the female grounding post 414, allowing the projection 427 of the female grounding post 414 to engage a locking groove of the male cable connector 429. The male cable connector 429 is then rotated with respect to the female grounding post 414 thereby electrically and mechanically releasably connecting the male cable connector 429 to the female grounding post 414. However, other methods and components may be used to releasably secure the male cable connector 429 to the female grounding post 414.

Figure 8:
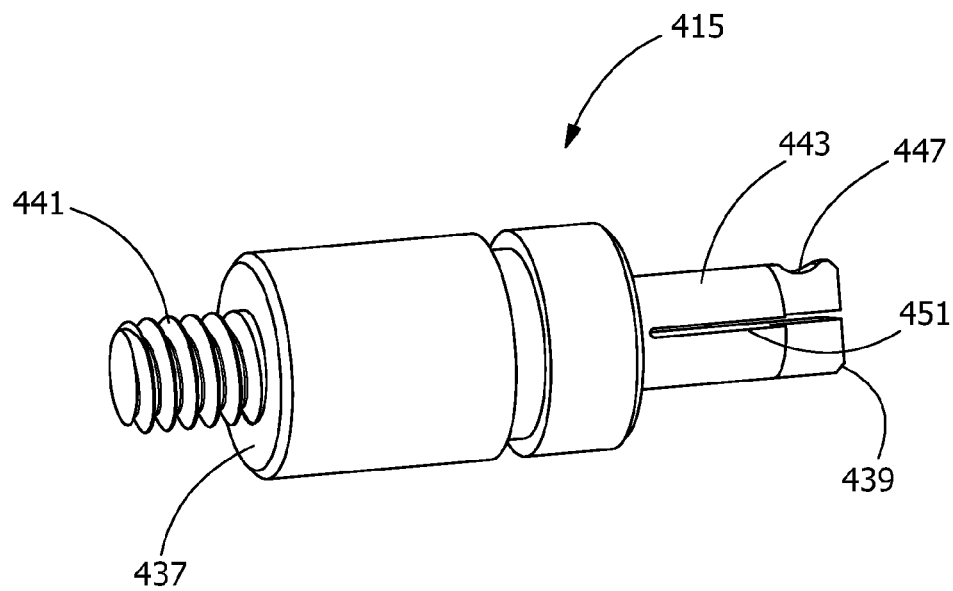
FIG. 8 illustrates a perspective view of an illustrative embodiment of a second alternate conductive mount or post which can be used with the magnet component, the conductive mount or post is a quick connect female connector.

As best shown in FIG. 8, the male quick connect electrical grounding post 415 has a substantially cylindrical configuration which a magnet engaging end 437 and a cable engaging end 439. The magnet engaging end 437 has a treaded projection 441 which is dimensioned to be received and maintained in a respective threaded opening 142 of the magnet assembly 112.

The grounding post 415 includes a mating projection 443 which extends from the cable engaging end 439 toward the magnet engaging end 437. The mating projection 443 is dimensioned to be received in a bore (not shown) of a mating female quick connect cable connector 449 (FIG. 10) connected to and end of a cable 402 therein. The mating projections 443 have recesses or locking grooves 447 positioned thereon.

The mating projection 443 extends substantially axially and has an outer diameter which is dimensioned to be received in the bore of the mating female cable connector 449. The projection 443 has a cylindrical configuration and has structures for releasably connecting the male grounding post 415 to the female cable connector 449. The projection 443 includes a substantially spiral-like locking groove 447, and a slot 451. These structures cooperate with corresponding structures on female cable connector 449 to releasably connect the grounding post 415 to the connector 449.

The locking groove 447 extends along a circumference of the projection 443. The locking groove 447 progresses around the circumference of the projection and axially along the projection 443 in a spiral-like fashion.

The slot 451 extends substantially along a diameter of the projection 443, and extends from a distal end of the projection 443 a certain distance along the longitudinal axis of the projection 443. The slot may be 451 offset on the projection 443 from a latitudinal midline of the projection by an angle. The compressive forces for causing contraction of the slot 451, when the female cable connector 449 is fully inserted and rotated relative to the male grounding post 415, are applied substantially perpendicularly to the slot 451. In addition, the small width of the slot 451 minimizes the compression needed to connect or disconnect the female cable connector 449 from the male grounding post 415.

In use, the female cable connector 449 is inserted onto the projection 443 of the male grounding post 415, allowing a locking groove of the female cable connector 449 to engage the projection 443 of the male grounding post 415. The female cable connector 449 is then rotated with respect to the male grounding post 415 thereby electrically and mechanically releasably connecting the female cable connector 449 to the male grounding post 415. However, other methods and components may be used to releasably secure the female cable connector 449 to the male grounding post 415.

Figure 10:
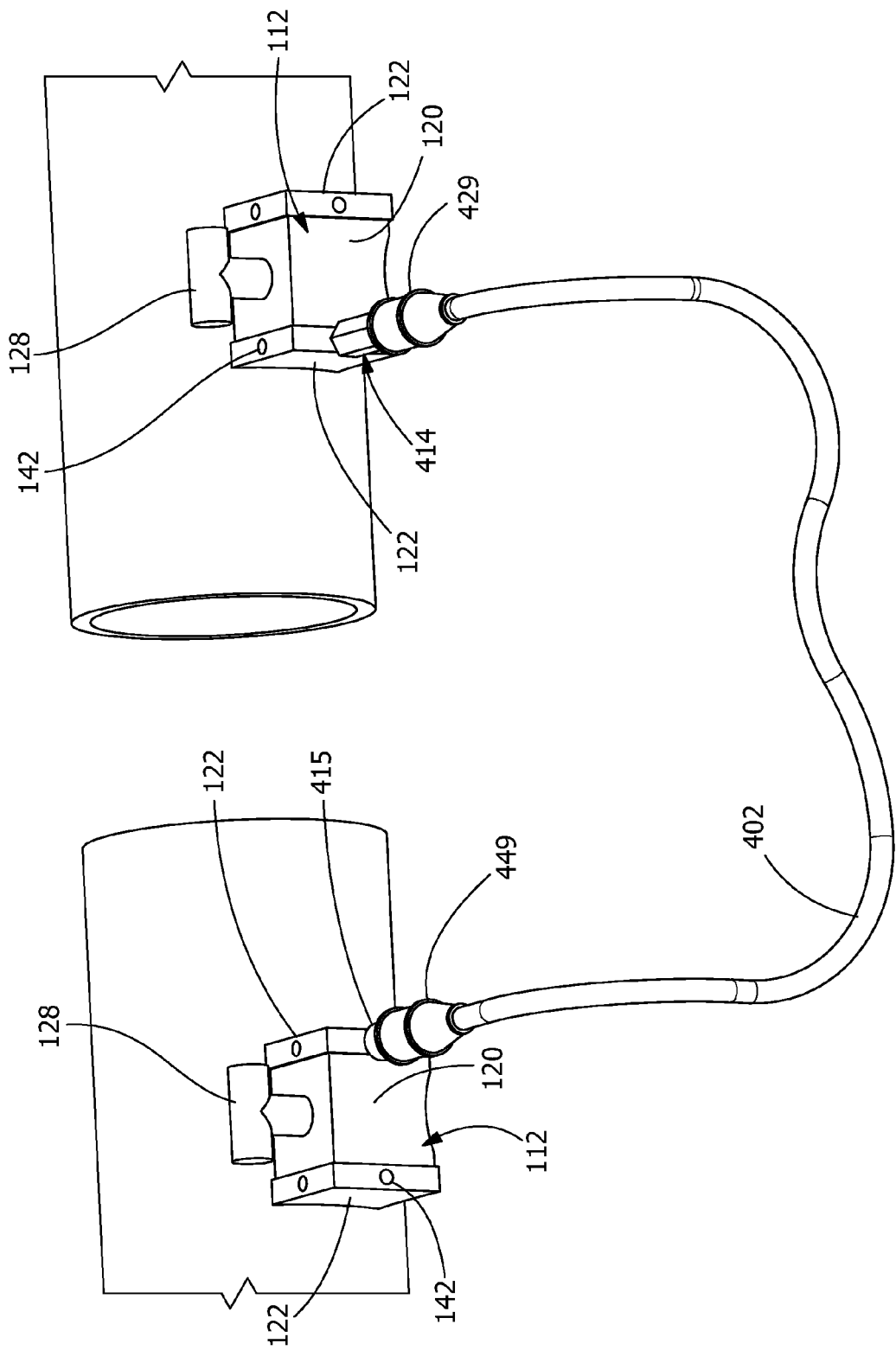

As best shown in FIG. 10, when the cable 402 is properly connected to the male grounding post 415 and the female grounding post 414, stray electrical current to be circumvented or detoured around an area of a pipe to be repaired, thereby preventing electrical shock to the personnel repairing the pipe.

In use, when attaching to a pipe, the following illustrative procedure can be used: i) excavate and expose pipe on both sides of the area to be worked on; ii) clean off pipe to bare metal on either side to allow magnetic components 112 to be physically and electrically attached to the pipe; iii) attach magnetic components with either a male grounding post or female grounding post to the pipe on both sides of the area to be worked on; and iv) attach cable 402 to the grounding posts. Other illustrative procedures, which include additional steps or which install the components in a different order may be used.

Figure 11:
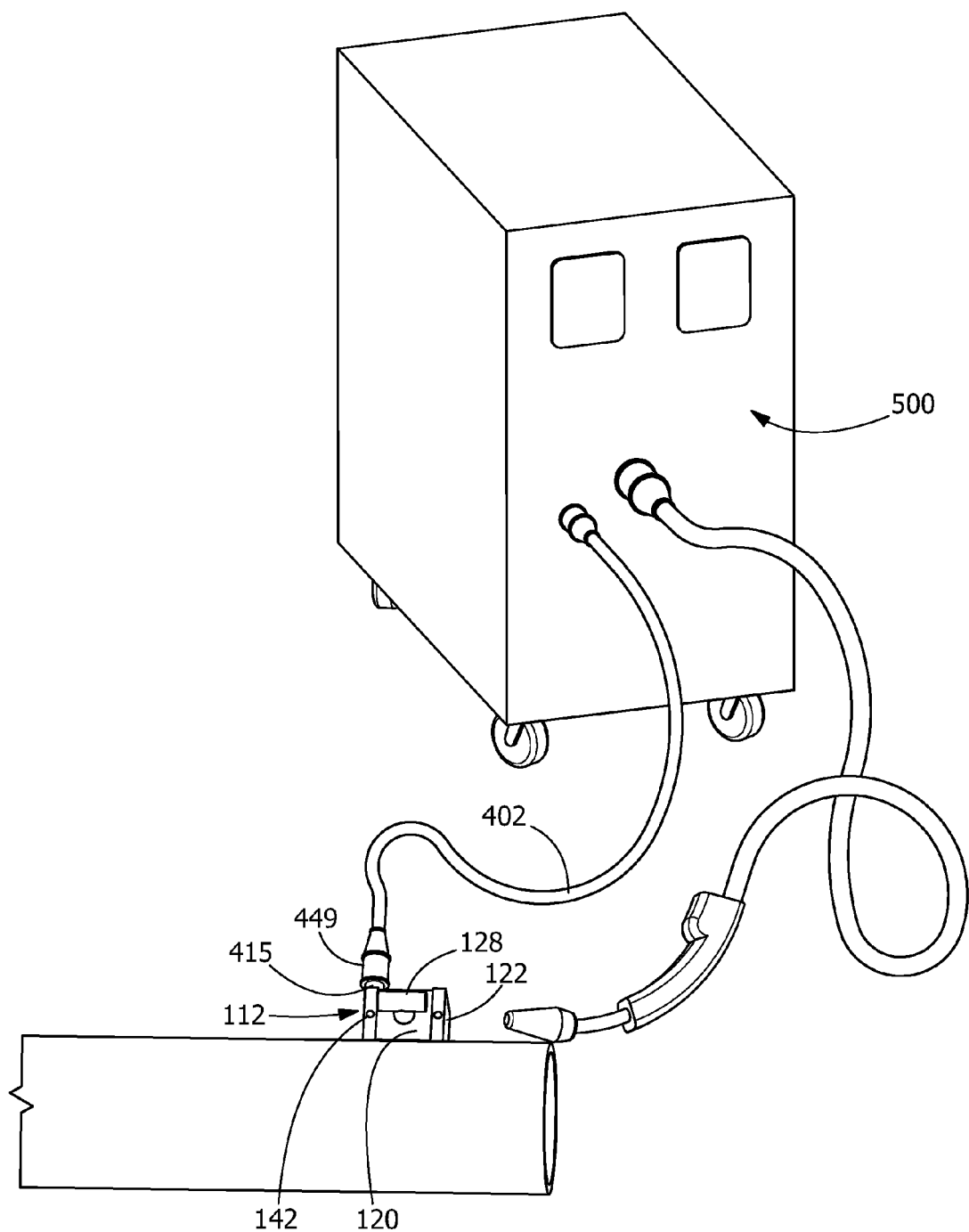
FIG. 11 illustrates a perspective view of on magnetic component of the temporary electrical bonding/grounding system connected to a welder.

Alternatively, as shown in FIG. 11, when one end of the cable 402 is properly connected either a male grounding post 415 or a female grounding post 414 on a magnet assembly 112 mounted on a pipe, and the other end of the cable 402 is mechanically and electrically connected to a welding apparatus 500, a route for the electrical current is created. This allows the circuit needed for welding to be completed while protecting the worker from harmful electrical current.

In the illustrative embodiments shown, a grounding connector of a cable of the welding apparatus or device is mechanically and electrically mounted to a grounding post which is attached to a grounding magnet which is attached to a metallic or conductive pipe. However, other diameters and shapes of the cables, grounding connectors, grounding posts and magnets may be used without departing from the scope of the invention. The cable extends and provides an electrical connection between the magnet which is connected to the pipe and the welding apparatus.

In use, when attaching to a pipe, the following illustrative procedure can be used: i) excavate and expose pipe on both sides of the area to be worked on; ii) clean off pipe to bare metal on either side to allow magnetic components 112 to be physically and electrically attached to the pipe; iii) attach the magnetic component with either a male grounding post or female grounding post to the pipe on both sides of the area to be worked on; iv) attach a cable 402 to the grounding post; and v) attach the cable 402 to the welding device or apparatus 500. Other illustrative procedures, which include additional steps or which install the components in a different order may be used.

A purpose of the grounding system is to stop any utility worker from getting shocked by stray electrical current. Stray electrical current may be a result of grounding the electrical system to metallic pipes. The grounding system also provides sufficient ground to allow for the proper and safe application of welding in the field.

Grounding the workpiece has similar benefit to grounding the welding machine enclosure. When the workpiece is grounded, it is at the same potential as other grounded objects in the area. In the event of insulation failure in the arc welding machine or other equipment, the voltage between the workpiece and ground will be limited.

The magnet assembly has a replacement handle and spring pin to facilitate easier movement when activating the magnet. The shoes have been machined to three radius so that there will be secure connections to metal pipes from 4" to 60" in diameter. Machined holes have been added to four side of the shoes to allow the grounding post to be attached in different angles depending on the size of the pipe or conditions of space. In the illustrative embodiment shown, the magnet assembly has 400-600 lbs of grip, but other pull forces can be used without departing from the scope of the invention. The magnet can be attached to the pipe using any of the three sides of the shoes.

As previously stated, the grounding system also works to prevent stray electricity. The system creates a route for the electrical current so that the worker can work between the two connections safely. If there is an occasion that work needs to be performed close to a third pipe line, a third magnet assembly can be attached to that pipe or grounding vise, depending on the size of the pipe and a second grounding post can be added to the closest magnet assembly and the other end of that cable would be attached to the grounding post. There might not be any work being performed on that pipe but in grounding the pipe it would protect the worker from accidently having contact with it and receiving a shock.

The simplicity of the grounding system is a worker attaches a magnet assembly to a pipe, adds a male or female grounding post and attaches a male or female grounding connector to the grounding post, as described. This creates a route for the electrical current, completing the circuit needed for welding and protecting the worker from harmful electrical current.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An apparatus for providing a temporary electrical bonding/grounding connection between a first conductive member and a second conductive member, the apparatus comprising:
   an electrically conductive cable having first and second ends;
   at least one magnet assembly for mounting to the first conductive member, the at least one magnet assembly having multiple arcuate surfaces of different radiuses of curvature, respective surfaces of the multiple arcuate surfaces being configured to properly mount to a respective arcuate surface of the first conductive member;
   a conductive coupling provided on the at least one magnet assembly, the conductive coupling configured to be electrically coupled to the first end of the cable; and
   the second end of the cable configured to be detachably and electrically coupled to the second conductive member.

2. The apparatus as recited in claim 1, wherein the magnetic assembly includes a magnet and shoes, the shoes provided at either end of the magnet.

3. The apparatus as recited in claim 2, wherein the multiple arcuate surfaces are provided on the shoes, each of the shoes has a first curved surface, a second curved surface, and third curved surface, the first curved surfaces of each of the shoes of the magnetic assembly are positioned to extend in the same direction, the second curved surfaces of each of the shoes of the magnetic assembly are positioned to extend in the same direction, which is in a different direction that the first curved surfaces, the third curved surfaces of each of the shoes of the magnetic assembly are positioned to extend in the same direction, which is in a different direction that the first curved surfaces and the second curved surface.

4. The apparatus as recited in claim 1, wherein the conductive coupling is a quick connect member which cooperates with a quick connect connector of the conductive cable.

5. The apparatus as recited in claim 2, wherein the shoes are made from material which is attracted to the magnet, thereby facilitating the physical and electrical connection between the shoes and the magnet.

6. The apparatus as recited in claim 2, wherein the shoes are fixed to the magnets.

7. The apparatus as recited in claim 3, wherein openings are provided on the shoes, the openings are positioned on multiple side surfaces of the shoes, the openings are dimensioned to receive the conductive coupling therein, the openings allow for the proper positioning and insertion of the conductive coupling into a respective opening regardless of which of the curved surfaces is placed in engagement with the respective arcuate surface of the first conductive member.

8. The apparatus as recited in claim 7, wherein the openings are threaded.

9. A bonding/grounding system to prevent workers from being exposed to stray electrical current in piping which conducts stray electrical current, the system comprising:
an electrically conductive cable having first and second ends;
a first magnetic assembly including a first removable conductive post which is dimensioned to receive the first end of the electrically conductive cable, the first magnetic assembly configured to be electrically and magnetically coupled to the first end of the electrically conductive cable;
a second magnetic assembly including a second removable conductive post which is dimensioned to receive the second end of the electrically conductive cable, the second magnetic assembly configured to be electrically and magnetically coupled to the second end of the electrically conductive cable;
wherein the temporary electrical bonding/grounding system allows stray electrical current in the piping to pass through the first magnetic assembly, the conductive cable and the second magnetic assembly to allow the stray electrical current to bypass an area of the piping to be worked on.

10. The bonding/grounding system as recited in claim 9, wherein the first and second magnetic assemblies each have multiple surfaces having different radiuses of curvature which cooperate with respective arcuate surfaces of the piping.

11. The bonding/grounding system as recited in claim 10, wherein each of the first and second magnetic assemblies include a magnet and shoes, the shoes provided at either end of the magnet.

12. The bonding/grounding system as recited in claim 11, wherein the multiple surfaces having different radiuses of curvature are provided on each of the shoes, the multiple surfaces include a first curved surface, a second curved surface, and third curved surface, the first curved surfaces of each of the shoes of the magnetic assembly are positioned to extend in the same direction, the second curved surfaces of each of the shoes of the magnetic assembly are positioned to extend in the same direction, which is in a different direction that the first curved surfaces, the third curved surfaces of each of the shoes of the magnetic assembly are positioned to extend in the same direction, which is in a different direction that the first curved surfaces and the second curved surface.

13. The bonding/grounding system as recited in claim 12, wherein the conductive post is a quick connect member which cooperates with a quick connect connector of the conductive cable.

14. The bonding/grounding system as recited in claim 11, wherein the shoes are made from material which is attracted to the magnet, thereby facilitating the physical and electrical connection between the shoes and the magnet.

15. The bonding/grounding system as recited in claim 11, wherein openings are provided on the shoes, the openings are positioned on multiple side surfaces of the shoes, the openings are dimensioned to receive the removable conductive post therein.

16. The bonding/grounding system as recited in claim 15, wherein the openings are threaded.

17. A bonding/grounding system to prevent workers from being exposed to stray electrical current when welding, the system comprising:
an electrically conductive cable having first and second ends;
a magnet assembly for mounting to a first conductive member, the magnet assembly having multiple arcuate surfaces of different radiuses of curvature, respective surfaces of the multiple arcuate surfaces being configured to properly mount to a respective arcuate surface of a work piece;
a conductive coupling provided on the magnet assembly, the conductive coupling configured to be electrically coupled to the first end of the cable; and
the second end of the cable configured to be detachably and electrically coupled to a welding apparatus;
wherein the temporary electrical bonding/grounding system allows the circuit needed for welding to be completed while grounding the work piece.

18. The bonding/grounding system as recited in claim 17, wherein the magnet assembly includes a magnet and shoes, the shoes provided at either end of the magnet.

19. The bonding/grounding system as recited in claim 18, wherein the multiple surfaces having different radiuses of curvature are provided on each of the shoes, the multiple surfaces include a first curved surface, a second curved surface, and third curved surface, the first curved surfaces of each of the shoes of the magnetic assembly are positioned to extend in the same direction, the second curved surfaces of each of the shoes of the magnetic assembly are positioned to extend in the same direction, which is in a different direction that the first curved surfaces, the third curved surfaces of each of the shoes of the magnetic assembly are positioned to extend in the same direction, which is in a different direction that the first curved surfaces and the second curved surface.

20. The bonding/grounding system as recited in claim 18, wherein openings are provided on the shoes, the openings are positioned on multiple side surfaces of the shoes, the openings are dimensioned to receive a conductive post therein, the post configured to make the mechanical and electrical engagement with the first conductive coupling, the openings allow for the proper positioning and insertion of the post into a respective opening regardless of which of the curved surfaces is placed in engagement with the respective arcuate surface of the first conductive member.

* * * * *